June 12, 1962  C. T. RASMUSSEN ET AL  3,038,266
SCRAPER

Filed Jan. 6, 1959

*INVENTOR*
CLARENCE T. RASMUSSEN
& JOHN H. CREIGHTON
BY
*C. T. Parker* and *W. A. Murray*
ATTORNEYS

United States Patent Office 3,038,266
Patented June 12, 1962

3,038,266
SCRAPER
Clarence T. Rasmussen, Moline, Ill., and John H. Creighton, Davenport, Iowa, assignors to Deere & Company, Moline, Ill., a corporation of Delaware
Filed Jan. 6, 1959, Ser. No. 785,203
5 Claims. (Cl. 37—129)

This invention relates to a combination tractor and carry-type scraper, the scraper being of the type having an elevator for moving dirt within the scraper bowl. Still more particularly this invention pertains to a drive mechanism extending from the tractor to the carry-type scraper and specifically to a drive mechanism on the forwardly positioned elevator.

One of the more conventional type carry-type scrapers presently in use includes a fore-and-aft extending material carrying box or bowl having a forwardly positioned cutting edge. Normally the bowl is open to the forward end so that material may pass over the cutting edge into the rear portions of the bowl. The bowl is conventionally carried on a pair of wheels positioned at the rear of the bowl. The forward end of the bowl is supported from the rear of the tractor by means of a beam structure having a pair of fore-and-aft extending and transversely spaced apart leg beams pivotally mounted at their rear ends to the sides of the bowl and interconnected at their forward ends by a cross beam. Centrally mounted on the cross beam and projecting forwardly therefrom is an integral rigid beam which extends forwardly to be mounted on a universal type hitch on the tractor. The vertical position of the forward cutting edge on the bowl is normally controlled by hydraulic units extending from the beam structure to the bowl. Also conventional in many types of scrapers is a forwardly positioned overshot elevator which is laterally disposed across the open forward end of the bowl and cooperates with the material passing over the cutting edge to aid in moving the material rearwardly in the bowl. An elevator of this nature normally is provided with mounting structure which permits floating action of the elevator over the dirt or material entering the bowl so that damage cannot be done to the elevator or cutting edge should a large stone or other foreign object be contacted by the scraper. The drive mechanism for the elevator is normally positioned to one side of the elevator and receives its power from the power source of the tractor.

There are several complications which enter into a drive extending from the tractor to the elevator drive means. First, it must be taken into consideration that there is both vertical and lateral swaying between the tractor and the scraper. Second, the drive from the tractor and the elevator must clear both the transverse beam at the forward end of the scraper as well as the fore-and-aft extending beam extending from the transverse beam. Third, since the beam structure is movable relative to the scraper and since the elevator is movable also relative to the scraper and yet is mounted on the scraper, the drive must compensate for movement of the beam structure or the elevator in any of a number of directions.

It is the primary object of this invention to provide a simple drive from the power take-off shaft on a tractor to the drive mechanism operating the elevator which is both novel in design as well as being adaptable for cheap manufacture and maintenance.

It is a further object of this invention to incorporate structure in the above drive which will automatically adjust itself to accommodate any relative movement between the elevator and the scraper, any relative movement between the beam structure and the scraper bowl, and any movement between the beam structure and the tractor.

Other objects and advantages of the present invention will become apparent to those skilled in the art as the nature of the invention is better understood from the following description and as shown in the accompanying drawings.

Figure 1:
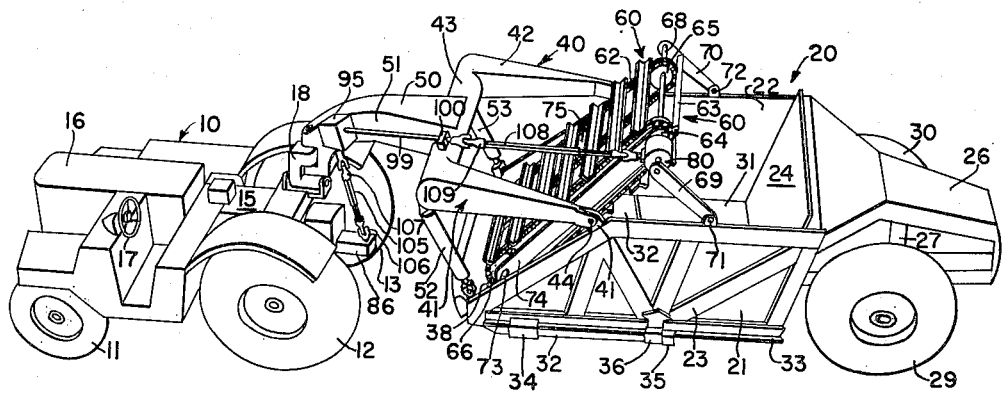
FIG. 1 is an overhead and side perspective of the tractor and scraper combination.

The tractor 10 has a pair of front steerable wheels, the left steerable wheel being indicated by the reference numeral 11, and a pair of rear traction wheels 12, 13 carried on a transverse axle structure 14. The tractor 10 includes an elongated tractor body 15 with a forwardly disposed engine or main power source mounted under a hood 16. To one side of the engine hood or housing 16 is an operator's station, indicated in its location by the steering wheel 17. Supported by and formed above the tractor axle 14 is structure forming a universal hitch 18 for connection to the trailing type scraper implement, indicated in its entirety by the reference numeral 20.

Figure 2:
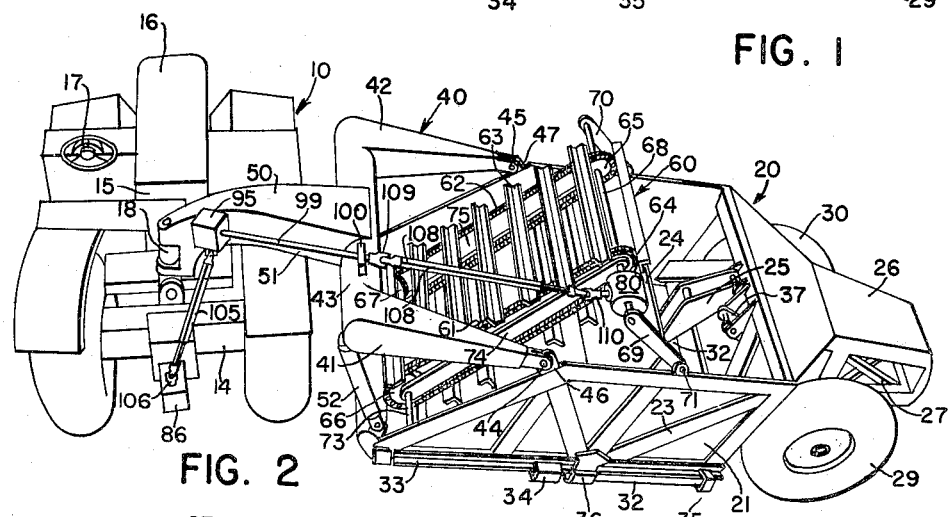
FIG. 2 is an overhead and side perspective view of the tractor and scraper combination, the tractor being substantially at 90° to the scraper or in a sharp turning position relative to the scraper.
Figure 3:
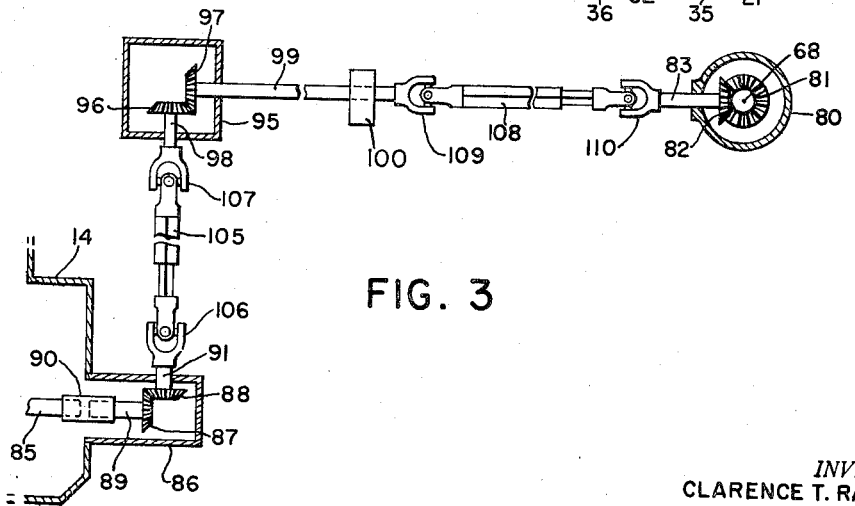
FIG. 3 is a schematic view of the drive extending from the power take-off shaft on the tractor to the drive mechanism of the elevator.

The scraper 20 is composed of an elongated dirt carrier or bowl including fore-and-aft extending upright sides 21, 22. The sides 21, 22 have superstructure or framework, such as at 23, which forms with other such framework a main frame for the implement. The rear wall of the bowl is in the form of an ejector plate 24 which is movable forwardly by means of a lever 25 (FIG. 2) controlled by hydraulic mechanism, not shown, but contained under a rear portion 26 of the bowl. As may be seen, the rearward projection includes therein suitable framework, such as at 27, to adequately support the entire scraper at its rear end on wheels 29, 30. The floor of the bowl is composed of front and rear portions 31, 32, the rear portion 31 being fixed to the side walls 21, 22 and a forward floor portion 32 supported on rail structures on the outer faces of the side walls 21, 22, the rail structure on the left wall 21 being indicated at 33. Referring specifically to the left side wall 21, the means mounting the floor on the rail 33 is shown as a pair of guides 34, 35 at the front and rear end of the floor section 32 which are flanged inwardly at their upper sections to overlie the rail or track 33. Also, a depending bracket 36 fixed to the lower portion of the frame structure 23 has an inwardly turned portion underlying the floor 32 to further slidably support the floor. A similar arrangement is provided adjacent the outer surface of the wall 22 and consequently the forward floor portion 32 may slide front and rear under the rear portion 31. Hydraulic means and linkage means, shown only partially at 37 in FIG. 2 operates to move the floor portion 32. The forward edge of the forward floor portion 32 is provided with a cutting edge, indicated at 38, which operates to dig into the earth to remove soil therefrom.

The scraper bowl is connected to the tractor by means of a Y-shaped beam structure indicated in its entirety by the reference numeral 40. The latter structure includes a pair of transversely spaced leg portions 41, 42 interconnected at their forward ends by a transverse beam portion 43. The rear ends of the leg portions 41, 42 are pivotally mounted to upper edges of the side walls 21, 22 by pivot pins 44, 45 respectively, which are connected to suitable brackets 46, 47 extending upwardly from the walls 21, 22. Projecting forwardly from the cross beam 43 is a goose neck beam portion 50 which has a hitch connection at its forward end connectible to the universal hitch 18. The goose neck beam is of rectangular cross section having side plates, only one of which is shown at 51, connected at their upper edges by a laterally disposed plate.

Extending between the cross beam 43 and the forward lower end of the side walls 21, 22 are hydraulic units 52, 53, controllable from the operator's station on the tractor, which operate to adjust the height of the cutting edge 38 as well as the remainder of the bowl 20.

Positioned adjacent the forward cutting edge 38 of the floor portion 32 and inclined upwardly and rearwardly therefrom is an elevator indicated in its entirety by the reference numeral 60. The elevator 60 extends across the open forward end of the bowl and operates to generally close that portion of the bowl. The elevator includes a pair of transversely spaced apart endless chains 61, 62 having angle iron slats 63 spaced lengthwise along the chains. The chains 61, 62 are mounted over sprockets 64, 65 at the upper end of the elevator and over sprockets 66, 67 at the lower end of the elevator. The sprockets 64, 65 are mounted over a common upper drive shaft 68, opposite ends of which are pivotally mounted on links 69, 70 respectively, which in turn are mounted at 71, 72 to the upper edges of the side walls 21, 22. The lower sprockets 66, 67 are mounted over a common shaft 73. The lower end of the elevator is free to gravitate over the earth moving over the cutting edge 38 although suitable abutments, not shown, limit its downward movement. Since the upper end of the elevator pivots about points 71, 72 the elevator as a whole is free to float over the dirt carried in the bowl 20. The shafts 68, 73 are interconnected by spacer bars 74, 75 which maintain the correct distance between the shafts.

Provided on the shaft 58 is a drive mechanism contained within a gear housing 80. The drive mechanism includes a bevel gear 81 fixed to the shaft 68 and meshing with a bevel pinion 82 supported on a short stub shaft 83 extending forwardly of the housing 80.

The drive linkage for operating the drive mechanism on the elevator receives its power from the power take-off shaft 85 extending rearwardly from the axle structure 14. Supported on the axle structure 14 is a first transmission or gear housing 86 having mounted therein bevel gears 87, 88, the bevel gear 87 being mounted on a shaft 89 coupled, as at 90, to the power take-off shaft 85. The bevel gear 88 is mounted on a vertically disposed stub shaft 91 projecting upwardly from the housing 86. Fixed to the side plate 51 of the goose neck beam 50 is a second transmission or gear housing 95 having mounted therein a pair of bevel gears 96, 97, the bevel gear 96 being mounted on a vertically disposed stub shaft 98 which extends downwardly from the underside of the housing 95 and the bevel gear 97 being mounted on a force transmitting shaft 99 which extends rearwardly from the housing 95 to a journal support 100 fixed to and extending upwardly from the cross beam 43. A vertically disposed drive shaft 105, telescopingly constructed to permit extension and retraction thereof, extends between the stub shafts 91 and 98 and is articulately connected to the shafts 91, 98 by means of universal joints 106, 107. The force transmitting shaft 99 is connected to the drive shaft 83 of the elevator drive mechanism by means of a second telescoping type shaft 108 which is extensible and retractable to automatically adjust itself to accommodate movement of the elevator. The shaft 108 is articulately connected to the shafts 99, 83 by universal joints 109, 110.

In operation, the scraper moves over the earth, and the hydraulic units 52, 53 operate to move the bowl and particularly the forward cutting edge 38 into or out of cutting engagement with the ground. The elevator 60 is of the overshot type having the lower run thereof moving upwardly and rearwardly to cooperate with the cutting edge to move the earth rearwardly into the bowl. Should a large obstruction be removed, the floating connection of the elevator will permit the elevator to rise to permit the obstruction to pass so as to prevent injury to the cutting edge 38 and to the elevator itself. As the bowl is filled, the elevator will float on the pile within the bowl so as to permit the bowl to carry the maximum amount of the dirt as well as completely fill all corners and spaces within the bowl.

The drive mechanisms for operating the elevator receives its power from the power take-off shaft 85 and is transmitted through the shafts 105, 99 and 108 to the gear mechanism on the elevator drive shaft 68. Through the articulate connections of the universal joints 106, 107 and the extension and retraction of the drive shaft 105, the drive between the gear housing 86, 95 will automatically adjust itself to accommodate any movement between the beam structure 40 and the tractor due to its mounting on the universal hitch 18. Obviously, it will adjust itself without interruption in driving the elevator. Due to the articulate connections of the universal joints 109, 110 and the effect of the telescoping arrangement of the shaft 108, the drive from the shaft 100 to the shaft 83 will automatically adjust itself to accommodate any movement between the transverse beam 43 and the drive shaft 68 of the elevator. The bevel gear drives 81, 82; 87, 88; and 96, 97 operate as corner-accommodating drive means to transmit power between the shafts 68, 83; 89, 91; and 98, 99 respectively. Therefore, it should be fully appreciated that at no time will interruption in operation of the elevator occur unless it is at the discretion of the operator from his position at the operator's station 17. It is clearly evident, from viewing FIG. 2, that the vertical shaft 105 and its associated connections to the shafts 91, 98 will swing laterally as the scraper bowl is turned by the tractor. By way of comparison, this type of connection to the side plate 51 provides a relatively simple and cheap manner of driving the elevator 16. Further, the drive linkage is always positioned above the cross beam 43 and clear of the other mechanism of the scraper. Also, the shaft 105 being disposed substantially vertically from the power take-off shaft 85 is positioned between the rear wheels 12, 13 of the tractor and is always clear of any forwardly projecting parts of the scraper. Also, in turning, the shaft 105 will remain substantially vertically and between the rear wheels 12, 13.

While only one form of the invention has been shown, it is recognized that other forms and variations will occur to those skilled in the art. Therefore, it should be understood that the purpose of illustrating and describing the operation and structure of the present invention in concise and detailed manner was to clearly set forth the principles of the invention and was not meant to limit or narrow the invention beyond the broad concept set forth in the appended claims.

What is claimed is:

1. In combination with a tractor having a transverse rear axle structure, a universal type hitch above the axle structure and a rearwardly projecting power take-off shaft below and closely rearward of the hitch, a scraper including a longitudinal material carrying bowl open at its forward end and having oppositely disposed upright sides interconnected at their lower edges by a floor structure having a transverse cutting edge adjacent the forward end of the box, a laterally disposed elevator mounted for floating motion on the scraper box and leading upwardly and rearwardly from the cutting edge, said elevator including an elevator drive means at one side thereof, means connecting the scraper to the tractor including a Y-shaped rigid beam structure having a pair of rearwardly projecting leg portions pivoted at their rear ends to the side walls, a transverse beam interconnecting the forward ends of the leg portions and a rigid projecting central beam extending forwardly from the transverse beam with means at its forward end for connection to the universal hitch, and power means for adjusting the box on the pivoted connections at the rear ends of the rearwardly projecting legs to raise or lower the cutting edge, drive means comprising: a first gear housing mounted on the tractor adjacent the power take-off shaft; a second gear housing fixed to the side of the forwardly extending beam closely rearward of the hitch so as to remain in substantial vertical alinement with the first gear housing as the beam swings on the hitch; an extensible and retractable vertically disposed drive shaft extending between said gear housings; a journal structure supported on the transverse beam; a force transmitting shaft extending from the second housing through and terminating rearwardly of the journal means; a first bevel gear mechanism supported in said first gear housing having connection to the power take-off shaft and an articulate connection to the lower end of the vertically disposed shaft for transmitting power from the former to the latter; a second bevel gear mechanism supported in said second gear housing having an articulate connection to the upper end of the vertical shaft and a connection to the force transmitting shaft for transmitting power from the former to the latter; an elevator drive shaft extending between the rear end of the force transmitting shaft to the elevator drive means; articulate connecting means at opposite ends of the elevator drive shaft connecting the elevator drive shaft to the force transmitting shaft and the elevator drive means, the elevator drive shaft being automatically adjustable in length to accommodate movement between the beam structure and the elevator.

2. In combination with a tractor having a transverse rear axle structure, a universal type hitch above the axle structure and a rearwardly projecting power take-off shaft below and closely rearward of the hitch, a scraper including a longitudinal material carrying bowl open at its forward end and having oppositely disposed upright sides interconnected at their lower edges by a floor structure having a transverse cutting edge adjacent the forward end of the box, a laterally disposed elevator mounted for floating motion on the scraper box and leading upwardly and rearwardly from the cutting edge, said elevator including an elevator drive means at one side thereof, means connecting the scraper to the tractor including a Y-shaped rigid beam structure having a pair of rearwardly projecting leg portions pivoted at their rear ends to the side walls, a transverse beam interconnecting the forward ends of the leg portions and a rigid projecting central beam extending forwardly from the transverse beam with means at its forward end for connection to the universal hitch, and power means for adjusting the box on the pivoted connections at the rear ends of the rearwardly projecting legs to raise or lower the cutting edge, drive means comprising: a first transmission housing mounted on the tractor adjacent the power take-off shaft; a second transmission housing fixed to the side of the forwardly extending beam closely rearward of the hitch so as to remain in substantial vertical alinement with the first gear housing as the beam swings on the hitch; an extensible and retractable vertically disposed drive shaft extending between said transmission housings; a journal structure supported on the transverse beam; a force transmitting shaft extending from the second housing through and terminating rearwardly of the journal means; a first corner-accommodating drive mechanism supported in said first housing having connection to the power take-off shaft and an articulate connection to the lower end of the vertically disposed shaft for transmitting power from the former to the latter; a second corner-accommodating drive mechanism supported in said second housing having an articulate connection to the upper end of the vertical shaft and a connection to the force transmitting shaft for transmitting power from the former to the latter; an elevator drive shaft extending between the rear end of the force transmitting shaft to the elevator drive means; articulate connecting means at opposite ends of the elevator drive shaft connecting the elevator drive shaft to the force transmitting shaft and the elevator drive means, the elevator drive shaft being automatically adjustable in length to accommodate movement between the beam structure and the elevator.

3. In combination with a tractor having a transverse rear axle structure, a universal type hitch above the axle structure and a rearwardly projecting power take-off shaft below and closely rearward of the hitch, a scraper including a longitudinal material carrying bowl open at its forward end and having oppositely disposed upright sides interconnected at their lower edges by a floor structure having a transverse cutting edge adjacent the forward end of the box, a laterally disposed elevator mounted for floating motion on the scraper box and leading upwardly and rearwardly from the cutting edge, said elevator including an elevator drive means at one side thereof, and means connecting the scraper to the tractor including a Y-shaped rigid beam structure having a pair of rearwardly projecting leg portions pivoted at their rear ends to the side walls, a transverse beam interconnecting the forward ends of the leg portions and a rigid projecting central beam extending forwardly from the transverse beam with means at its forward end for connection to the universal hitch and power means for adjusting the box on the pivoted connections at the rear ends of the rearwardly projecting legs to raise or lower the cutting edge, drive means comprising: a first transmission housing mounted on the tractor adjacent the power take-off shaft; a second transmission housing fixed to the side of the forwardly extending beam closely rearward of its forward end so as to remain in substantial vertical alinement with the first transmission housing as the beam swings about the hitch; an extensible and retractable vertically disposed drive shaft extending between said transmission housings; a journal structure supported on the beam structure rearward of the second housing; force transmitting shaft means extending rearwardly from the second housing through and terminating rearwardly of the journal means; a first corner-accommodating drive mechanism supported in said first housing having connection to the power take-off shaft and an articulate connection to the lower end of the vertically disposed shaft for transmitting power from the former to the latter; a second corner-accommodating drive mechanism supported in said second housing having an articulate connection to the upper end of the vertical shaft and a connection to the force transmitting shaft means for transmitting power from the former to the latter; and means within the force transmitting shaft means being automatically adjustable to effect adjustment of the shaft means to accommodate movement between the beam structure and the elevator.

4. In combination with a tractor having a transverse rear axle structure and hitch structure defining a vertical pivot projecting upwardly from the axle structure and a rearwardly projecting power take-off shaft below and closely rearward of the hitch structure, a scraper including a longitudinal material carrying box open at its forward end and having oppositely disposed upright sides interconnected at their lower edges by a floor structure having a transverse cutting edge adjacent the forward end of the box, a laterally disposed elevator mounted for floating motion on the scraper box and leading upwardly from the cutting edge, said elevator including an elevator drive means at one side thereof, means connecting the scraper to the tractor including a rigid beam structure having a pair of transversely spaced rearwardly projecting leg portions pivoted at their rear ends to the side walls, and rigidly interconnected at their forward ends and a forwardly extending beam structure having means at its forward end for connection to the vertical pivot, and means for adjusting the box on the pivoted connection at the rear ends of the rearwardly projecting legs to raise or lower the cutting edge, drive means comprising: a first transmission housing mounted on the tractor adjacent the power take-off shaft; a second transmission housing fixed to the side of the forwardly extending beam and spaced closely rearwardly of its forward end so as to remain in substantial vertical alinement with the first transmission as the beam swings laterally about the vertical pivot of the hitch structure; an extensible and retractable vertically disposed drive shaft extending between said transmission housings; a journal structure supported on the beam structure rearward of said second housing; force transmitting shaft means extending from the second housing through the journal means and to the elevator drive means; a first gear corner-accommodating drive mechanism supported in said first housing having connection to the power takeoff shaft and an articulate connection to the lower end of the vertically disposed shaft for transmitting power from the former to the latter; and a second corner-accommodating drive mechanism supported in said second gear housing having an articulate connection to the upper end of the vertical shaft and a connection to the force transmitting shaft means for transmitting power from the former to the latter.

5. In combination with a tractor having a transverse rear axle structure, hitch structure mounted thereon defining a vertical pivot, and a rearwardly projecting power take-off shaft below and closely rearward of the hitch structure, a scraper including a longitudinal material carrying box open at its forward end and having oppositely disposed upright sides interconnected at their lower edges by a floor structure having a transverse cutting edge adjacent the forward end of the box, a laterally disposed elevator mounted for floating motion on the scraper box and leading upwardly from the cutting edge, said elevator including an elevator drive means at one side thereof, means connecting the scraper to the tractor including a rigid beam structure having a pair of rearwardly projecting leg portions rigidly interconnected at their forward ends and pivoted at their rear ends to the side walls and a rigid forwardly projecting central beam having means at its forward end for connection to the vertical pivot, and means for adjusting the box on the pivoted connection at the rear ends of the rearwardly projecting legs to raise or lower the cutting edge, drive means comprising: a first gear housing mounted on the tractor adjacent the power take-off shaft; a second gear housing fixed to the side of the forwardly extending beam and spaced closely rearwardly of its forward end so as to remain in substantial vertical alinement with the first gear housing as the beam swings laterally about the vertical pivot of the hitch structure; an extensible and retractable vertically disposed drive shaft extending between said gear housings; force transmitting shaft means extending rearwardly from the second housing to the elevator drive means; a first bevel gear mechanism supported in said first gear housing having connection to the power take-off shaft and a universal type connection to the lower end of the vertically disposed shaft for transmitting power from the former to the latter; and a second bevel gear mechanism supported in said second gear housing having a universal type connection to the upper end of the vertical shaft and a connection to the force transmitting shaft means for transmitting power from the former to the latter.

References Cited in the file of this patent

UNITED STATES PATENTS

| | | |
|---|---|---|
| 1,661,737 | Raimer | Mar. 6, 1928 |
| 1,889,600 | Hansen | Nov. 29, 1932 |
| 2,169,612 | McMillan | Aug. 15, 1939 |
| 2,276,573 | Gustafson | Mar. 17, 1942 |
| 2,363,071 | LeTourneau | Nov. 21, 1944 |
| 2,791,041 | Hancock | May 7, 1957 |
| 2,791,044 | Hancock | May 7, 1957 |
| 2,931,451 | Hancock | Apr. 5, 1960 |
| 2,956,353 | Hanner et al. | Oct. 18, 1960 |

FOREIGN PATENTS

| | | |
|---|---|---|
| 203,362 | Australia | Sept. 6, 1956 |